Patented Feb. 22, 1938

2,108,824

UNITED STATES PATENT OFFICE 2,108,824

AZO COMPOUNDS AND PROCESS FOR DYEING THEREWITH

James G. McNally and Joseph B. Dickey, Rochester, N. Y., assignors to Eastman Kodak Company, Rochester, N. Y., a corporation of New Jersey No Drawing. Application September 1, 1936, Serial No. 98,926

20 Claims. (Cl. 8—5)

This invention relates to the coloration of materials made of or comprising organic derivatives of cellulose, and more particularly to the coloration of these materials with nuclear non-sulfonated aromatic azo derivatives of phenyl alkyl ketones. The invention includes the process of coloring with the nuclear non-sulfonated azo compounds of the invention, the materials colored therewith and a valuable new class of azo compounds.

Organic derivatives of cellulose are characterized by an indifferent affinity for the usual cotton or wool dyes, especially the ordinary water soluble dyes. Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

We have discovered that the azo compounds having the general formula

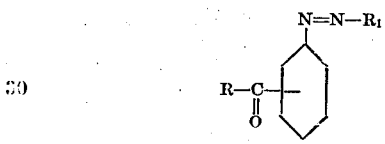

wherein R represents an alkyl group and $R_1$ represents a nuclear non-sulfonated aromatic coupling component constitute a valuable class of compounds and when applied to the coloration of organic derivatives of cellulose, such as cellulose acetate silk, for example, produce dyeings of good fastness to light and washing.

The aromatic coupling component employed in the preparation of the azo compounds of our invention may be a nuclear non-sulfonated heterocyclic nucleus, such as pyridine or 1-phenyl-3-methyl-5-pyrazolone, or a nuclear non-sulfonated aryl nucleus of the benzene or naphthalene series, for example. Referring more particularly to R, R may be methyl, ethyl, propyl or other higher alkyl group. Where R is an alkyl group containing eight (8) or more carbon atoms, the azo compound is characterized by solubility in both oil and wax.

Advantageously, the coupling component is a nuclear non-sulfonated hydroxyalkylarylamine such as ethyl-β-hydroxyethylaniline, ethyl-γ-hydroxypropylaniline, di-γ-hydroxypropylaniline and β-hydroxyethyl-α-naphthylamine, for example. The azo compounds formed when these components are coupled with a nuclear non-sulfonated diazotized amino phenyl alkyl ketone, particularly an amino acetophenone, constitute a valuable new class of azo compounds and when employed as dyes for organic derivatives of cellulose produce dyeings thereon of good to excellent fastness to light and washing.

The azo compounds of our invention may be prepared by diazotizing an aminophenyl alkyl ketone, p-amino acetophenone, for example, in a dilute mineral acid solution of the amino phenyl alkyl ketone with nitrous acid in the usual manner and coupling, with a coupling component such as those above mentioned, in an alkaline solution in accordance with customary practice as more fully described and illustrated hereinafter.

Many of the amino phenyl alkyl ketones may be prepared as described in the literature. These compounds may, for example, be prepared by preparing the corresponding nitro phenyl alkyl ketone and converting it to the amino compound by reduction.

By another method of preparing amino phenyl alkyl ketones, a chlorphenylalkyl ketone is heated at elevated temperature, advantageously 100–250° C., with ammonia dissolved in water or a solvent, such as alcohol, benzene, ether or dioxane. The reaction may be carried out in the presence of a catalyst or mixture of catalysts such as copper, copper bronze, cuprous halide, cuprous acetate, cuprous oxide, copper sulfate or ammonium nitrate, for example.

In order that our invention may be more fully understood, the preparation of a number of amino phenyl alkyl ketones will be described, but it will be understood that these type compounds may be prepared in any suitable manner.

Preparation of 2-aminophenylmethyl ketone 100 grams of 2-chlorophenylmethyl ketone, 1 liter of ammonia water (specific gravity 0.9), 0.5 gram of finely divided copper, and 1 gram of cuprous oxide are charged into an autoclave and heated at 185–200° C. for 24 hours with continuous agitation. The autoclave is then allowed to cool, and the brown colored reaction product is recovered by filtration. The 2-aminophenylmethyl ketone prepared as above is sufficiently pure for use without purification, but, if desired, it may be purified in any suitable manner before use.

Preparation of 2-aminophenylcetyl ketone 150 grams of 2-bromophenylcetyl ketone, 1 liter of ammonia water (specific gravity 0.9), 0.5 gram of active copper, and 1 gram of cuprous oxide are charged into an autoclave and heated at 185–200° C. for 24 hours with continuous agitation. The autoclave is then allowed to cool and the 2-aminophenylcetyl ketone formed by the reaction recovered by filtration and subjected to purification, if desired.

Preparation of 4-aminophenylmethyl ketone 100 grams of 4-chlorophenylmethyl ketone, 1 liter of ammonia water (specific gravity 0.9), 0.5 gram of active copper, and 1 gram of cuprous oxide are charged into an autoclave and heated at 185–200° C. for 24 hours with continuous agitation. The autoclave is then allowed to cool, and the 4-aminophenylmethyl ketone formed is recovered by filtration. If desired the 4-aminophenylmethyl ketone may be purified before use but ordinarily purification is not necessary. The purified material melts at 104–105° C.

Preparation of 4-aminophenylethyl ketone 100 grams of 4-chlorophenylethyl ketone, 1 liter of ammonia water (specific gravity 0.9), 0.5 gram of active copper and 1 gram of cuprous chloride are charged into an autoclave and heated at 185–200° C. for 24 hours with continuous agitation. Upon cooling, the 4-aminophenylethyl ketone resulting from the reaction is recovered by filtration. The 4-aminophenylethyl ketone thus prepared is pure enough for use without purification, but, if desired, it may be purified in any suitable manner. The pure amine melts at 139–140° C.

The following examples will illustrate the method of preparation of the azo compounds of our invention. Quantities are expressed in parts by weight.

Example 1

13.5 parts of m-aminoacetophenone are dissolved in 100 parts of water containing 29.5 parts of 36% hydrochloric acid. The resulting solution is then cooled to a temperature approximating 0–5° C. and the m-aminoacetophenone diazotized by the addition, with stirring, of 6.9 parts of sodium nitrite dissolved in water. Diazotization is complete when a positive starch potassium iodide test is obtained after 20 minutes.

14 parts of dimethyldihydroresorcinol are dissolved in 200 parts of water containing 21.2 parts of sodium carbonate. The resulting solution is cooled by the addition of ice, for example, and the diazo solution prepared above is added, with stirring. The reaction mixture is allowed to stand for two hours and then made acid to litmus with acetic acid, after which the precipitated azo compound is filtered, washed and dried.

Barbituric acid and thiobarbituric acid may be coupled to diazotized m-aminoacetophenone in a similar manner as described above.

Example 2

18.1 parts of di-β-hydroxyethylaniline are dissolved in about 158 parts of cold ethyl alcohol. A diazo solution prepared as described in Example 1 is then added with stirring. Upon completion of the coupling action, sodium acetate or sodium carbonate is added until the solution no longer turns Congo red paper blue. After about one hour, water is slowly added, with stirring, to precipitate the azo compound formed, which is recovered in the form of fine orange-colored crystals. The recovered precipitate may be washed and dried in accordance with customary practice.

Exactly similar results can be obtained using acetic or dilute hydrochloric acid as solvents, in place of ethyl alcohol.

Example 3

13.5 parts of m-aminoacetophenone are dissolved in 100 parts of water containing 29.5 parts of 36% hydrochloric acid. The resulting solution is then cooled to a temperature approximating 0–5° C. and the m-aminoacetophenone diazotized by the addition, with stirring, of 6.9 parts of sodium nitrite dissolved in water.

10.7 parts of p-cresol are dissolved in 100 parts of water containing 8 parts of sodium hydroxide. The solution is well cooled with ice, for example, and the diazo solution prepared as above is slowly added with stirring. After standing one hour the mixture is made acid to litmus with acetic acid and the precipitated yellow azo compound is filtered, washed and dried.

Example 4

13.5 parts of p-aminoacetophenone are dissolved in 100 parts of water containing about 29.5 parts of 36% hydrochloric acid. The resulting solution is cooled to a temperature approximating 0–5° C. and the p-aminoacetophenone diazotized by slowly adding, with stirring, a water solution of 6.9 parts of sodium nitrite. The diazotization is complete when a positive starch potassium iodide test is obtained after twenty minutes.

A water solution of 12.8 parts of barbituric acid is prepared by dissolving the latter in 500 parts of a water and ice mixture containing 16.4 parts of sodium carbonate. The diazonium chloride solution prepared above is then added with stirring. The sodium salt of the desired azo compound precipitates at once. Stirring is continued for one hour and acetic acid is then added until the mixture is acid to litmus. The precipitated greenish-yellow compound is recovered by filtration, washed and dried. The recovered compound colors acetate silk yellow.

Example 5

13.5 parts of p-aminoacetophenone are diazotized as described in Example 4 and added, with stirring, to an iced hydrochloric acid solution of dimethylaniline prepared by dissolving 12.1 parts of dimethylaniline in 100 parts of water containing 11.8 parts of 36% hydrochloric acid. The reaction mixture is allowed to stand for fifteen minutes, after which it is made neutral to Congo paper with sodium acetate. When coupling is complete, as may be determined by testing with sodium β-naphthol paper, the precipitated orange-colored azo compound is recovered by filtration and washed and dried.

If desired, the preparation can be carried out in acetic acid solution instead of hydrochloric acid. The azo compound formed colors cellulose acetate silk a bright orange shade of excellent fastness to light.

The diazo solution prepared as described above can be coupled with diphenylamine in an exactly similar manner as employed in the case of dimethylaniline, and the resulting compound colors cellulose acetate silk orange.

Example 6

13.5 parts of p-aminoacetophenone are diazotized as described in Example 4 and added with stirring to a well cooled solution of 10.7 parts of p-cresol dissolved in 100 parts of water containing 8 parts of sodium hydroxide. Cooling may be effected in any desired manner as by the addition of ice, for example. After standing one hour, the resulting mixture is made acid to litmus with acetic acid and the precipitated yellow azo compound is filtered, washed and dried.

Example 7

14.9 parts of o-aminopropiophenone are dissolved in 100 parts of water containing about 29.5 parts of 36% hydrochloric acid. The resulting solution is then cooled to a temperature approximating 0–5° C. and the o-aminopropiophenone diazotized by slowly adding, with stirring, a water solution of 6.9 parts of sodium nitrite.

The diazo solution prepared above is added, with stirring, to a cooled solution of 13.5 parts of methylethylaniline dissolved in 100 parts of water containing about 17.7 parts of 36% hydrochloric acid. After standing a short time, the solution is slowly made neutral to Congo paper with sodium acetate, and upon completion of the coupling reaction, the precipitated azo compound is recovered by filtration, washed and dried.

Example 8

19.1 parts of p-aminophenylamyl ketone are diazotized with sodium nitrite in accordance with the method described in Example 1.

16.9 parts of ethyl-$\beta$-hydroxyethyl-m-toluidine are dissolved in acetic acid and the diazo solution prepared above is added with stirring. After standing for a time the mixture is made neutral to Congo red paper by the addition of sodium bicarbonate. Upon completion of the coupling reaction water is added and the precipitated azo compound is recovered by filtering, washed and dried.

Example 9

20.3 parts of o-aminophenylcyclohexyl ketone are diazotized with sodium nitrite in the usual manner.

24.1 parts of m-$\beta$-hydroxyethoxy-di-$\beta$-hydroxyethylaniline are dissolved in cool dilute hydrochloric acid and coupled with the diazo solution prepared above. The precipitated azo compound is recovered by filtering, washed, and dried.

Example 10

33.1 parts of p-aminophenylcetyl ketone are diazotized with sodium nitrite as described in Example 7.

23 parts of m-chloroethylglycerylaniline are dissolved in cool dilute aqueous hydrochloric acid solution and coupled in the usual manner with the diazo solution of p-aminophenylcetylketone. Upon completion of the coupling reaction, the resulting azo compound is recovered by filtering, washed and dried. Azo compounds of this type are oil and wax soluble.

Example 11

13.5 parts of p-aminoacetophenone are diazotized as described in Example 1 and coupled with 21.1 parts of di-$\beta$-hydroxyethylcresidine dissolved in an iced dilute hydrochloric acid solution in a similar manner as that previously described. Upon completion of the coupling reaction, the precipitated azo compound may be recovered by filtration, washed, and dried.

Di-$\gamma$-hydroxypropylcresidine, di-$\gamma$-hydroxybutylcresidine or ethyl-$\gamma$-hydroxypropylcresidine, for example, may be used in place of the di-$\beta$-hydroxyethylcresidine in the above example.

Example 12

13.5 parts of o-aminoacetophenone are diazotized with 6.9 parts of sodium nitrite as described in Example 1 and coupled with 23.9 parts of 3 6-dimethoxyethyl-$\gamma$-hydroxypropylaniline dissolved in cool dilute hydrochloric acid. Coupling may be effected as previously described. The precipitated azo compound is recovered by filtration, washed, and dried.

Example 13

13.5 parts of p-aminocetophenone are diazotized with 6.9 parts of sodium nitrite as described in Example 1 and coupled in the usual manner with 18.6 parts of $\beta$-hydroxyethyl-$\alpha$-naphthylamine dissolved in 150 parts of water containing about 23.6 parts of 36% hydrochloric acid. The azo compound resulting from the coupling reaction is recovered by filtration, washed and dried.

Example 14

13.5 parts of p-aminoacetophenone are diazotized with 6.9 parts of sodium nitrite as described in Example 1 and coupled with 26.9 parts of

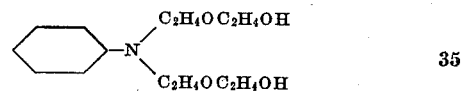

dissolved in dilute iced hydrochloric acid. Coupling may be effected as previously described. The precipitated azo dye compound is recovered by filtration, washed and dried. Compounds having the general formula—

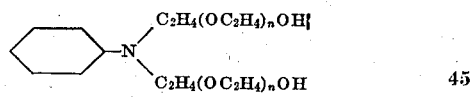

where $n$ is two or more, may be substituted for

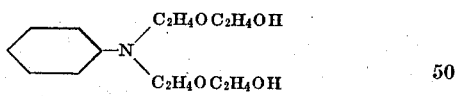

in the above reaction.

Example 15

14.9 parts of m-aminopropiophenone are diazotized with sodium nitrite in accordance with the method described in Example 1.

13.5 parts of methylethylaniline are dissolved in 100 parts of water containing about 17.7 parts of 36% hydrochloric acid. Ice is added and the diazo solution prepared above is added with stirring. After standing a short time the mixture is made neutral to Congo red paper with sodium acetate. Upon completion of the coupling reaction, the azo compound formed is recovered by filtration and subjected to the customary washing and drying treatment.

Example 16

19.1 parts of m-aminophenylamylketone are diazotized with sodium nitrite and added with stirring to 16.9 parts of ethyl-$\beta$-hydroxyethyl-m-toluidine dissolved in an acetic acid solution. After standing a short time the mixture is made neutral to Congo red paper with sodium bicarbonate. When coupling is complete water is added and the precipitated azo compound is filtered, washed and dried.

Example 17

20.3 parts of m-aminophenylcyclohexylketone are diazotized with sodium nitrite in the usual manner. 24.1 parts of m-β-hydroxyethoxy-di-β-hydroxyethylaniline are dissolved in dilute iced hydrochloric acid and the diazo solution prepared above is added, with stirring. The coupling reaction is carried out in a manner similar to that previously described. The azo compound formed is recovered by filtration, washed and dried.

Example 18

33.1 parts of

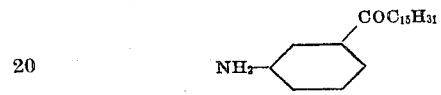

are diazotized with sodium nitrite, according to the method described in Example 1, and coupled with 27.9 parts of sodium β-sulfoethylbutylaniline dissolved in water. The azo compound resulting from the coupling reaction is salted out by the addition of sodium chloride filtered, washed and dried.

Example 19

13.5 parts of m-aminoacetophenone are diazotized with 6.9 parts of sodium nitrite as described in Example 1, and coupled with 21.1 parts of di-β-hydroxyethylcresidine. Coupling is carried out in a cooled dilute hydrochloric acid solution as previously described. The resulting azo compound is recovered by filtration, washed and dried.

Example 20

13.5 parts of m-aminoacetophenone are diazotized with 6.9 parts of sodium nitrite as described in Example 1 and coupled with 23.9 parts of 3,6-dimethoxyethyl - γ - hydroxypropylaniline dissolved in cool dilute hydrochloric acid. Coupling is carried out in the manner previously described. The azo compound formed is recovered by filtration, and subjected to any further treatment desired, such as washing and drying.

Example 21

13.5 parts of m-aminoacetophenone are diazotized with 6.9 parts of sodium nitrite as described in Example 1, and coupled with 18.6 parts of β-hydroxyethyl - α - naphthylamine. Advantageously, coupling is effected in a dilute hydrochloric acid solution. The azo compound formed is recovered in any suitable manner, such as by filtration, for example, washed and dried.

Example 22

13.5 parts of m-aminoacetophenone are diazotized with 6.9 parts of sodium nitrite as described in Example 1 and coupled with 26.9 parts of—

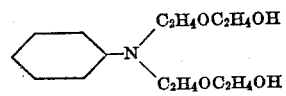

Advantageously, coupling is effected in a dilute hydrochloric acid solution in a known manner. The azo compound formed may be recovered in any suitable manner, such as by filtration, for example, washed and dried. Compounds having the general formula—

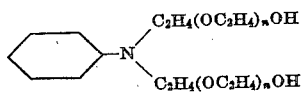

wherein $n$ is two or more, may be substituted for—

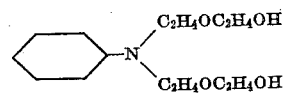

in the above reaction.

Example 23

16.1 parts of ω-methoxy-4-aminophenylmethyl ketone

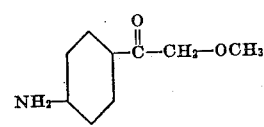

are diazotized in the usual manner.
38 parts of

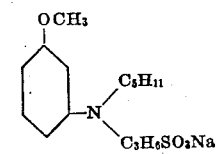

are dissolved in water, the resulting solution is iced and the diazo solution prepared above is added slowly with stirring. Concurrently with the addition of the azo solution there is added a water solution of sodium acetate or sodium carbonate at such a rate that the reaction mixture is just neutral to Congo red paper. Upon completion of the coupling reaction the dye is precipitated by the addition of sodium chloride, filtered, washed and dried.

The above examples illustrating suitable methods of preparing a number of compounds of our invention are not to be considered as limiting it to the specific conditions shown, as various modifications within the scope of the invention can be made. The following tabulation will further illustrate the compounds included within the scope of our invention, together with the color they produce on cellulose acetate silk:

| Amine | Coupling component | Color on cellulose acetate silk |
|---|---|---|
| p-Aminoacetophenone | Barbituric acid | Yellow. |
| Do | 2, 6-Diamino pyridine | Orange. |
| Do | Dimethyldihydroresorcinol | Golden yellow. |
| Do | m-Phenylene diamine | Red. |
| Do | p-Cresol | Gold. |
| Do | Phenol | Golden yellow. |
| Do | α-Naphthol | Orange. |
| Do | α-Naphthylamine | Do. |
| Do | Dimethyl aniline | Do. |
| Do | Diphenyl amine | Do. |
| Do | Di-β-hydroxyethyl aniline | Red. |
| Do | o-Amino phenol | Yellow. |

| Amine | Coupling component | Color on cellulose acetate silk |
|---|---|---|
| p-Aminoacetophenone | Salicylic acid | Yellow. |
| Do | Resorcinol | Do. |
| Do | 1-Phenyl-3-methyl-5-pyrazolone | Do. |
| Do | m-Chloro-di-γ-hydroxypropylaniline | Orange. |
| Do | m-Methyl-di-γ-hydroxypropylaniline | Do. |
| Do | m-Methoxy-di-γ-hydroxypropylaniline | Do. |
| m-Aminoacetophenone | Dimethyldihydroresorcinol | Yellow. |
| Do | Barbituric acid | Do. |
| Do | Thiobarbituric acid | Orange yellow. |
| Do | Phenylmethylpyrazolone | Golden yellow. |
| Do | Phenyliminopyrazolone | Do. |
| Do | Iminobarbituric acid | Yellow. |
| Do | Sodium β-sulfoethylmethylaniline | Orange yellow. |
| Do | Diphenylamine | Do. |
| Do | Dimethylaniline | Do. |
| Do | Dimethyl-α-naphthylamine | Do. |
| Do | Di-(β-hydroxyethyl)-α-naphthylamine | Do. |
| Do | Sodium ω-sulfomethyldiphenylamine | Do. |
| Do | Di (β-hydroxyethyl) aniline | Do. |
| Do | Methyl-β-hydroxyethylaniline | Do. |
| Do | Salicylic acid | Yellow. |
| Do | p-Cresol | Do. |
| Do | Di-(β-hydroxyethyl) aminoanisole | Orange yellow. |
| Do | Methyl-β-hydroxypropylaniline | Do. |
| Do | Di-(β-hydroxypropyl) aniline | Do. |
| Do | Di-(γ-hydroxypropyl) aniline | Do. |
| Do | Methyl-γ-hydroxypropylaniline | Do. |
| Do | Ethylhydroxyethylaniline | Do. |
| Do | Butylhydroxyethylaniline | Do. |
| Do | Isoamylhydroxyethylaniline | Do. |
| Do | Ethylglycerylaniline | Do. |
| Do | Isoamylhydroxypropylaniline | Do. |
| Do | Propylhydroxypropylaniline | Do. |
| Do | Propylhydroxyethylaniline | Do. |
| Do | Methylaniline | Do. |
| Do | Hydroxyethylaniline | Orange. |
| Do | 2,4-dihydroxyquinoline | Yellow. |
| p-Aminoacetophenone | (1) Methylethylaniline | Orange. |
| Do | (2) Ethyl-β-hydroxyethylaniline | Do. |
| Do | (3) Ethyl-γ-hydroxypropylaniline | Do. |
| Do | (4) Di-γ-hydroxypropylaniline | Do. |
| Do | (5) Di-β-hydroxyethylcresidine | Do. |
| Do | (6) Di-glyceryl iso-cresidine | Do. |
| Do | (7) 2,6-dimethoxycyclohexylglycerylaniline | Do. |
| Do | (8) Propyl-γ-hydroxypropyl-m-toluidine | Do. |
| Do | (9) β-Methoxyethyl-β-hydroxyethyl-m-anisidine | Do. |
| Do | (10) Phenyl cresidine | Do. |
| Do | (11) β-Hydroxyethyldiphenylamine | Do. |
| Do | (12) γ-Hydroxypropylcresidine | Do. |
| Do | (13) m-Anisidine | Orange yellow. |
| Do | (14) Cresidine | Do. |
| Do | (15) Sodium cetyl-β-sulfoethylaniline | Orange. |
| Do | (16) β-Hydroxyethyl-α-naphthylamine | Red. |
| p-Aminobutyrophenone | 1–12 above | Orange. |
| Do | 13–14 above | Orange yellow. |
| Do | 15 above | Orange. |
| Do | 16 above | Red. |
| p-Aminophenylcyclohexylketone | 1–12 above | Orange. |
| Do | 13–14 above | Orange yellow. |
| Do | 15 above | Orange. |
| Do | 16 above | Red. |
| p-Aminopalmitophenone | 1–12 above | Orange. |
| Do | 13–14 above | Orange yellow. |
| Do | 15 above | Orange. |
| Do | 16 above | Red. |
| o-Aminoacetophenone | 1–15 above | Yellowish orange. |
| Do | 16 above | Orange. |
| o-Aminobutyrophenone | 1–15 above | Yellowish orange. |
| Do | 16 above | Orange. |
| o-Aminophenylcyclohexylketone | 1–15 above | Yellowish orange. |
| Do | 16 above | Orange. |
| o-Aminopalmitophenone | 1–15 above | Yellowish orange. |
| Do | 16 above | Orange. |
| m-Aminoacetophenone | (1) Methylethylaniline | Orange yellow. |
| Do | (2) Ethyl-β-hydroxyethylaniline | Do. |
| Do | (3) Ethyl-γ-hydroxypropylaniline | Do. |
| Do | (4) Di-γ-hydroxypropylaniline | Do. |
| Do | (5) Di-β-hydroxyethylcresidine | Do. |
| Do | (6) Di-glyceryl iso-cresidine | Do. |
| Do | (7) 3,6-dimethoxycyclohexylglycerylaniline | Do. |
| Do | (8) Propyl-γ-hydroxypropyl-m-toluidine | Do. |
| Do | (9) β-Methoxyethyl-β-hydroxy-ethyl-m-anisidine | Do. |
| Do | (10) Phenyl cresidine | Do. |
| Do | (11) β-Hydroxyethyldiphenylamine | Do. |
| Do | (12) γ-Hydroxypropylcresidine | Do. |
| Do | (13) Sodium cetyl-β-sulfoethylaniline | Do. |
| Do | (14) β-Hydroxyethyl-α-naphthylamine | Orange. |
| Do | (15) Cresidine | Yellow. |
| Do | (16) m-Anisidine | Do. |
| m-Aminobutyrophenone | 1–13 above | Orange yellow. |
| Do | 14 above | Orange. |
| Do | 15–16 above | Yellow. |
| m-Aminophenylcyclohexylketone | 1–13 above | Orange yellow. |
| Do | 14 above | Orange. |
| Do | 15–16 above | Yellow. |
| m-Aminopalmitophenone | 1–13 above | Orange yellow. |
| Do | 14 above | Orange. |
| Do | 15–16 above | Yellow. |

In employing the nuclear non-sulfonated aromatic azo derivatives of our invention as dyes they will ordinarily be applied to the material in the form of an aqueous suspension which can be prepared by grinding the dye to a paste in the presence of soap or other suitable dispersing agent and dispersing the resulting paste in water. Dyeing operations can, with advantage in the case of cellulose acetate silk, for example, be conducted at a temperature of 80–85° C., but any suitable temperature may be used. In accordance with the usual dyeing practice, the cellulose acetate silk material to be dyed will ordinarily be added to the dye bath at a temperature lower than that at which the main portion of the dyeing is to be effected, a temperature approximately 45–55° C., for example, following which the temperature of the dye bath will be raised to that selected for carrying out the dyeing operation. The temperature at which the dyeing is conducted will vary, depending for example, on the method selected for applying the dye and the particular material or materials undergoing coloration.

It will be understood that the nuclear non-sulfonated aromatic azo compounds may be applied to the material to be colored in any suitable manner. Coloration may be effected, for example, by dyeing, printing or stenciling. Dispersing or solubilizing agents that can be employed for preparing suspensions of the dye include soap, sulphoricinoleic acid, a salt of sulphoricinoleic acid, and sulfonated oleic, stearic or palmitic acid, or salts thereof such for instance as the sodium or ammonium salts.

While it is preferred to effect coloration by applying the dye compound directly from an aqueous dye bath to the material to be colored, as above described, the nuclear non-sulfonated azo compounds of our invention may be applied using the methods applicable to the so-called ice colors. Employing this method of dyeing, an aminophenylalkyl ketone is absorbed and diazotized on the fiber, after which the dye is formed in situ by developing with a suitable coupling component. Conversely, the material may be treated to absorb the coupling component and the dye subsequently formed in situ by coupling with a nuclear non-sulfonated phenyl alkyl ketone diazonium salt.

The following example illustrates one satisfactory way in which dyeing may be carried out in accordance with our invention.

*Example 24*

1.5 parts of the dye compound formed by coupling diazotized p-aminoacetophenone with di-γ-hydroxypropylaniline are finely ground with soap and dissolved in 3000 parts of water. The dispersion thus prepared is heated to a temperature approximating 45–55° C. and 100 parts of cellulose acetate silk, in the form of fabric or yarn, for example, are added to the dye bath after which the temperature is gradually raised to 80–85° C. and the silk worked for several hours at this latter temperature. Upon completion of the dyeing operation, the cellulose acetate silk is removed, washed with soap, rinsed and dried. The cellulose acetate silk is dyed an orange shade.

It will be understood that dyeing operations can be carried out in a manner similar to that described above by the substitution of other compounds of the invention. Thus, p-acetobenzene azo di-β-hydroxyethylaniline and m-acetobenzene azo di-γ-hydroxypropylcresidine, for example, may be employed. Similarly other materials, in addition to cellulose acetate silk, made of or comprising organic derivatives of cellulose can be dyed or colored employing the specific dye compound of the example or other compounds of the invention.

We claim:

1. A process for directly coloring organic derivatives of cellulose which comprises applying an aqueous suspension of a nuclear non-sulfonated aromatic azo derivative of a phenyl alkyl ketone to an organic derivative of cellulose.

2. A process for directly coloring organic derivatives of cellulose which comprises applying an aqueous suspension of a nuclear non-sulfonated aromatic azo derivative of an acetophenone to an organic derivative of cellulose.

3. A process for directly coloring an organic acid ester of cellulose which comprises applying thereto an aqueous suspension of an azo compound having the general formula:

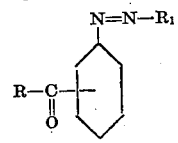

wherein R represents an alkyl group and $R_1$ represents a nuclear non-sulfonated aromatic coupling component.

4. A process for directly coloring an organic acid ester of cellulose which comprises applying thereto an aqueous suspension of an azo compound having the general formula:

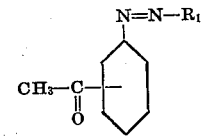

wherein $R_1$ represents a nuclear non-sulfonated aromatic coupling component.

5. A process for directly coloring an organic acid ester of cellulose which comprises applying thereto an aqueous suspension of an azo compound having the general formula:

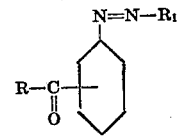

wherein R represents an alkyl group and $R_1$ represents a nuclear non-sulfonated hydroxyalkylarylamine.

6. A process for directly coloring an organic acid ester of cellulose which comprises applying thereto an aqueous suspension of an azo compound having the general formula:

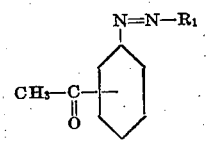

wherein $R_1$ represents a nuclear non-sulfonated hydroxyalkylarylamine.

7. A process for directly coloring an organic acid ester of cellulose which comprises applying thereto an aqueous suspension of an azo compound having the general formula:

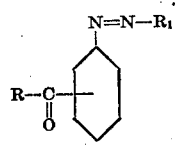

wherein R represents an alkyl group and $R_1$ represents a nuclear non-sulfonated heterocyclic group or a nuclear non-sulfonated aryl group selected from the group consisting of the benzene and naphthalene series.

8. A process for directly coloring an organic acid ester of cellulose which comprises applying thereto an aqueous suspension of an azo compound having the general formula:

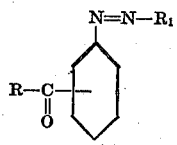

wherein R represents an alkyl group and $R_1$ represents a nuclear non-sulfonated aromatic coupling component of the benzene series.

9. A process for directly coloring an organic acid ester of cellulose which comprises applying thereto an aqueous suspension of an azo compound having the general formula:

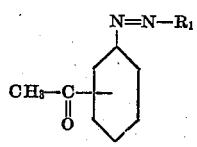

wherein $R_1$ represents a nuclear non-sulfonated hydroxyalkylamine of the benzene series.

10. An azo compound having the general formula:

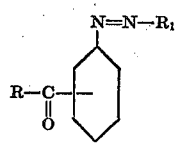

wherein R represents an alkyl group, and $R_1$ represents a nuclear non-sulfonated hydroxyalkylarylamine.

11. An azo compound having the general formula:

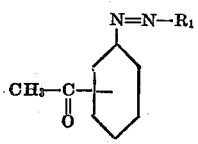

wherein $R_1$ represents a nuclear non-sulfonated hydroxyalkylarylamine.

12. An azo compound having the general formula:

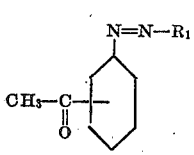

wherein $R_1$ represents a nuclear non-sulfonated hydroxyalkylarylamine of the benzene series.

13. A compound having the formula:

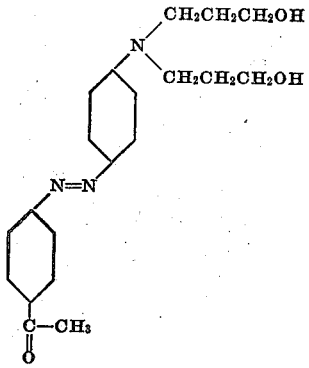

14. A compound having the formula:

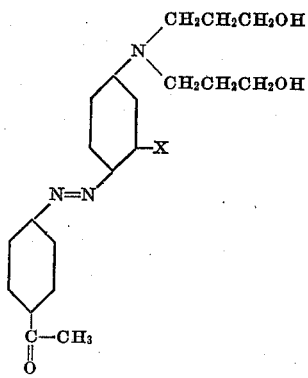

wherein X represents chlorine, a methyl group or a methoxy group.

15. A compound having the formula:

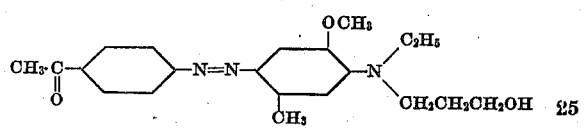

16. Material containing an organic acid ester of cellulose colored with an azo compound having the general formula:

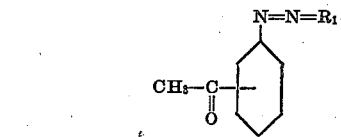

wherein $R_1$ represents a nuclear non-sulfonated aromatic coupling component of the benzene series.

17. Material containing an organic acid ester of cellulose colored with an azo compound having the general formula:

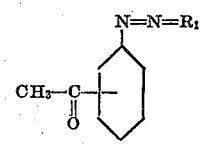

wherein $R_1$ represents a nuclear non-sulfonated hydroxyalkylamine of the benzene series.

18. Material containing an organic derivative of cellulose colored with an azo compound having the general formula:

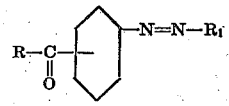

wherein R represents an alkyl group and $R_1$ represents a member selected from the class consisting of a nuclear non-sulfonated heterocyclic nucleus and a nuclear non-sulfonated aryl nucleus of the benzene series.

19. Material containing an organic acid ester of cellulose colored with an azo compound having the general formula:

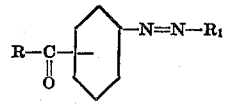

wherein R represents an alkyl group and $R_1$ represents a member selected from the class consisting of a nuclear non-sulfonated heterocyclic nucleus and a nuclear non-sulfonated aryl nucleus of the benzene series.

20. A cellulose acetate colored with an azo compound having the general formula:

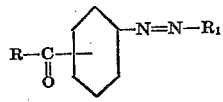

wherein R represents an alkyl group and $R_1$ represents a member selected from the class consisting of a nuclear non-sulfonated heterocyclic nucleus and a nuclear non-sulfonated aryl nucleus of the benzene series.

JAMES G. McNALLY.
JOSEPH B. DICKEY.